(No Model.)
E. ARNOLD.
HOOF EXPANDER.
No. 422,488.      Patented Mar. 4, 1890.
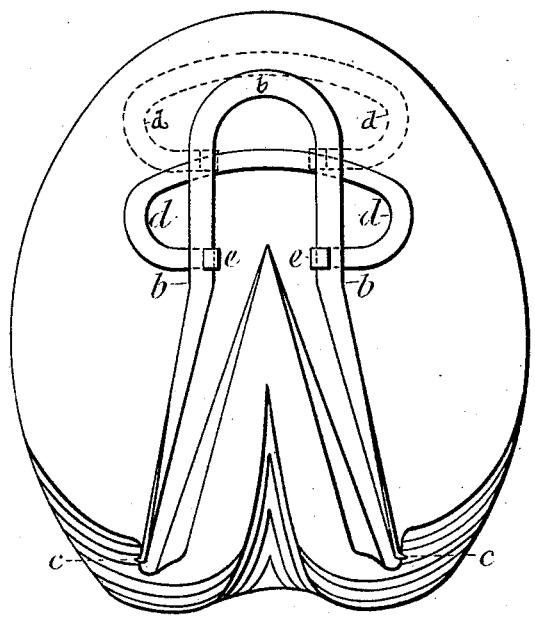
*Fig. 1.*
*Fig. 2.*
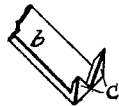
Witnesses.
Walter E. Ward.
Charles H. Willard.
Inventor.
Emmett Arnold.
per Frederick W. Cameron.
Attorney.

UNITED STATES PATENT OFFICE.

EMMETT ARNOLD, OF BURNT HILLS, NEW YORK.

HOOF-EXPANDER.

SPECIFICATION forming part of Letters Patent No. 422,488, dated March 4, 1890.

Application filed April 24, 1889. Serial No. 308,471. (No model.)

*To all whom it may concern:*

Be it known that I, EMMETT ARNOLD, a citizen of the United States, residing at Burnt Hills, town of Ballston, in the county of Saratoga and State of New York, have invented a new and useful Improvement in Hoof-Expanders, of which the following is a specification.

My invention relates to improvements in hoof-expanders; and the objects of my invention are to provide a hoof-expander that may be easily and readily adjusted in such a manner as to occasion a greater or less expansion, as desired, and also to provide a means for expanding one side or quarter of the hoof to a greater extent than the other. I accomplish these objects by the mechanism illustrated in the accompanying drawings, in which—

Figure 1 represents the under side of a horse's hoof with one part of my expander placed thereon. Fig. 2 is a detail view of the end of the spring $b$.

Similar letters refer to similar parts throughout both views.

The spring $b$ is usually made of steel or wire, and is provided at each end with two sharp-pointed projections or prongs $c\,c$, which are secured to the wall at the heel of the hoof. The spring $b$ extends from the heel, where it is secured, toward the toe of the hoof and at a point so near the toe that the shoe will overlap it, and then returns to the heel on the side of the frog opposite that from which it started, and is there secured to the wall by the projections $c\,c$. As thus placed, the shoe will come into contact with and will serve to retain in position the spring at both toe and heel. The resiliency of the spring will tend to spread the hoof, exerting a constant even pressure on each side equally.

In order to intensify the pressure exerted by the spring $b$, I attach the adjustable spring $d$ thereto. The spring $d$ has each end turned over in such a manner as to inclose the side of the spring $b$, as shown at $e$, and is easily movable on said spring. The spring $d$ extends outwardly from the spring $b$ on each side and is held in position by passing under the spring $b$. It may be placed over the spring $b$, providing it is made to extend under the shoe to hold it in position. The spring $d$ tends to force apart the ends of the spring $b$, and this in turn produces a like effect on the sides of the hoof.

In order that the spring $d$ may be adjusted, it is necessary to make the sides of the spring $b$ near the toe parallel, as shown in Fig. 1, and when it is desired to use less force than that exerted when the adjustable spring $d$ is in the position denoted by full lines in Fig. 1 it may be placed nearer the toe, as shown by dotted lines in that figure.

My invention is very simple, easily adjusted, fits snugly close to the hoof, is not heavy or cumbersome, and does its work positively and satisfactorily.

What I claim as my invention, and desire to secure by Letters Patent, is—

In a hoof-expander, the combination of a spring $b$, provided with prongs $c\,c$ on each end, in contact with the walls of the hoof and extending toward and bent near the toe of the hoof, with an adjustable spring $d$, attached to each side of the spring $b$ near the toe, all substantially as described.

EMMETT ARNOLD.

Witnesses:
FREDERICK W. CAMERON,
WALTER E. WARD.